(12) United States Patent
Gilstad

(10) Patent No.: US 8,210,542 B1
(45) Date of Patent: Jul. 3, 2012

(54) PLUNGER SEAL RING

(76) Inventor: Dennis W. Gilstad, San Antonio, TX (US)

( * ) Notice: Subject to any disclaimer, the term of this patent is extended or adjusted under 35 U.S.C. 154(b) by 0 days.

(21) Appl. No.: 13/184,965

(22) Filed: Jul. 18, 2011

(51) Int. Cl.
*F16J 15/00* (2006.01)
*F16J 15/26* (2006.01)

(52) U.S. Cl. ........ 277/530; 277/553; 277/567; 277/605; 277/645; 277/647

(58) Field of Classification Search .................. 277/530, 277/553, 567, 605, 645, 647, 644
See application file for complete search history.

(56) References Cited

U.S. PATENT DOCUMENTS

| | | | |
|---|---|---|---|
| 829,546 A * | 8/1906 | Schou | 277/538 |
| 3,617,589 A | 11/1971 | Jones-Hinton et al. | |
| 4,103,909 A * | 8/1978 | Hoffman et al. | 277/520 |
| 4,269,419 A * | 5/1981 | Brant | 277/605 |
| 4,300,775 A * | 11/1981 | Ringel | 277/589 |
| 4,572,519 A | 2/1986 | Cameron et al. | |
| 4,618,154 A | 10/1986 | Freudenthal | |
| 5,472,216 A | 12/1995 | Albertson et al. | |
| 5,580,068 A * | 12/1996 | Gundy | 277/605 |
| 5,799,953 A * | 9/1998 | Henderson | 277/554 |
| 6,007,070 A | 12/1999 | Heathcott et al. | |
| 6,432,320 B1 | 8/2002 | Bonsignore et al. | |
| 6,918,595 B2 | 7/2005 | Proper | |
| 7,847,057 B2 | 12/2010 | Muller et al. | |
| 2010/0148452 A1 * | 6/2010 | Westhoff et al. | 277/605 |
| 2012/0025471 A1 * | 2/2012 | Andrick et al. | 277/314 |

OTHER PUBLICATIONS

Victrex Press Information, Internet download, Jul. 2011: Victrex PEEK Polymer Ring Helps Extend Life of Well Service Plunger Packing.

* cited by examiner

*Primary Examiner* — Vishal Patel

(57) ABSTRACT

One or more elastomeric multifunction rings augment a plunger packing assembly within a plunger pump packing box. Each such ring comprises a totally-enclosed circumferential tubular cavity filled with a fluid medium which transmits hydraulic pressure throughout the tubular cavity. Longitudinal ring compression secondary to pumped fluid pressure acts through the compliance of each ring to increase tubular cavity hydraulic pressure, resulting in radial ring expansion. Ring expansion is both inward toward a plunger and, simultaneously, outward toward its packing box. Inward expansion tends to seal the extrusion gap, while outward expansion improves heat transfer via the ring from plunger to packing box. Periodic reduction of pumped fluid pressure tends to reverse radial ring expansion. Thus, relatively more effective sealing and heat transfer functions occur as a pump's pressure stroke increases pumped fluid pressure. And sealing is attenuated between pressure strokes to reduce both frictional ring wear and heat generation.

20 Claims, 3 Drawing Sheets

PLUNGER SEAL RING

FIELD OF THE INVENTION

The invention relates generally to plunger pumps, and more specifically to the plunger packing assemblies installed to reduce leakage around the plunger(s) of such pumps.

BACKGROUND

Certain plunger pumps, such as those for oil field use, are typically designed in two sections, the (proximal) power section (herein "power end") and the (distal) fluid section (herein "fluid end"). The power end usually comprises a crankshaft, reduction gears, bearings, connecting rods, crossheads, crosshead extension rods, etc. The fluid end of a plunger pump comprises a housing which in turn comprises one or more functional units, each functional unit comprising a suction valve, a discharge valve, a plunger bore, and a plunger, plus plunger packing assemblies, high-pressure seals, etc.

Conventional plunger pumps employ a housing member (herein a packing box) containing plunger packing assemblies analogous to packing assemblies shown in U.S. Pat. No. 4,572,519, incorporated herein by reference and referred to subsequently as the '519 patent. Within a packing assembly one or more packing rings having corresponding chevron-shaped ends are retained and compressed between a proximal brass (or bronze) adapter ring and a distal adapter ring.

The packing rings have chevron-shaped ends (sometimes termed "chevron-shaped packing rings") and are relatively stiff, comprising, for example, layered fabric-reinforced rubber. Each ring end's chevron shape arises from a concave or convex circumferential feature which is an extension of their layered construction, allowing modest radial expansion under longitudinal compression to achieve a tight seal around a plunger. Longitudinal compression force, in turn, is provided by a gland nut and by the cyclically increased pressure of the pumped fluid.

Turning the gland nut adjusts longitudinal preload (i.e., longitudinal compressive force) that is applied to the packing ring(s) to prevent excessive cyclic movement under load and to achieve a desired seal around the plunger. But even after reducing longitudinal preload to zero by backing out the gland nut, packing rings typically remain tightly sealed around the plunger because of their stiffness. Thus, the plunger must virtually always be withdrawn from the packing box to allow removal of the packing ring(s), as may be required during pump maintenance. Plunger withdrawal, however, is generally difficult because of interference between the plunger and various power end components.

The above maintenance issues arise in conventional plunger pumps because designers make the packing rings relatively stiff, while still flexible enough under longitudinal compression to achieve a tight seal around the plunger. Sealing against fluid leakage, however, requires that the packing rings substantially retain their functional (chevron) end shape. Such shape retention becomes progressively more difficult as frictional heat developed during pump operation softens the packing rings and predisposes them to extrusion under pressure through a gap (the extrusion gap) between the proximal adapter ring and the plunger.

A conflict thus arises when packing ring compression is increased. Increased compression may help to improve the plunger seal as well as to reduce migration of the packing ring material through the extrusion gap. But increased compression of the packing rings also results in generation of additional frictional heating that degrades the rings' functional integrity. Since dissipating this heat within the confines of the packing box is difficult, high pressure plunger pumps are often limited to relatively short periods of operation (e.g., no more than a few hours) to limit extrusion of the packing ring material through the extrusion gap. If pump run times are extended, packing rings tend to overheat and fail prematurely.

The above conflict has been partially resolved by replacing the proximal bronze adapter ring with a proximal adapter ring comprising PEEK polymer in certain seals. PEEK (polyetheretherketone) is a high performance thermoplastic, a portion of which moves radially inward under longitudinal compression, tending to narrow the extrusion gap. Such radial inward (gap-narrowing) movement is termed "elongation" in industry advertising and is said to be more prominent in a PEEK adapter ring than in an analogous bronze adapter ring. While the use of commercially-available PEEK adapter rings appears to increase plunger packing service life, frictional wear and heat generation problems remain.

SUMMARY OF THE INVENTION

One or more elastomeric multifunction rings augment a plunger packing assembly within a plunger pump packing box. Each ring comprises a totally-enclosed circumferential tubular cavity filled with a fluid medium which transmits hydraulic pressure throughout the tubular cavity. Longitudinal ring compression secondary to pumped fluid pressure acts through the compliance of each ring to increase tubular cavity hydraulic pressure, resulting in radial ring expansion. Thus, the effective radial expansion (i.e., "elongation") of an elastomeric multifunction ring of the invention is increased by the ring's internal hydraulic pressure. Such increased effective radial expansion is not seen in a ring that lacks a totally-enclosed, fluid-filled circumferential tubular cavity.

Elastomeric multifunction ring expansion is both inward toward a plunger and, simultaneously, outward toward its packing box. Inward expansion tends to seal the extrusion gap, while outward expansion improves heat transfer via the ring from plunger to packing box. Conversely, periodic reduction of pumped fluid pressure tends to reverse radial ring expansion.

Note that relatively more effective sealing and heat transfer functions occur as a pump's pressure stroke increases pumped fluid pressure, when these functions are most needed. And sealing is attenuated between pressure strokes to reduce both frictional ring wear and heat generation, thereby prolonging service life.

To assist understanding of the invention, first, second and third embodiments are discussed only as illustrative examples. In a first invention embodiment, a circular elastomeric multifunction ring symmetrical about a longitudinal axis has a first end, a second end, a cylindrical inner surface, a cylindrical outer surface, and a totally-enclosed circumferential tubular cavity. The tubular cavity is filled with a fluid medium for transferring heat and for transmitting hydraulic pressure throughout the tubular cavity. The elastomeric multifunction ring comprises at least one thermoplastic polymer, the tubular cavity is spaced equidistant from the inner surface and the outer surface, and at least the first ring end comprises a chevron-shaped circumferential feature. Equidistant spacing of the tubular cavity from the inner surface and the outer surface ensures that longitudinal compression of a circular elastomeric multifunction ring results in uniformly symmetrical (longitudinal) shortening of the ring.

The first embodiment's fluid medium may comprise mineral oil, which may additionally comprise nanoparticles (e.g., metallic nanoparticles) to enhance heat transfer. Nanoparticles may comprise, for example, copper, beryllium, titanium, nickel, iron, alloys or blends thereof, and carbon. The term nanoparticle may conveniently be defined as including particles having an average size of up to about 2000 nm. See, e.g., U.S. Pat. No. 6,432,320 B1, incorporated herein by reference and referred to subsequently as the '320 patent. The thermoplastic polymer may comprise polyaryletherketone (PAEK), for example, polyetheretherketone (PEEK). See, e.g., U.S. Pat. No. 7,847,057 B2, incorporated here by reference and referred to subsequently as the '057 patent.

In a second invention embodiment a circular elastomeric multifunction ring symmetrical about a longitudinal axis has a first end, a second end, a cylindrical inner surface, a cylindrical outer surface, and a totally-enclosed circumferential tubular cavity, the tubular cavity being filled with a fluid medium for transferring heat and for transmitting hydraulic pressure throughout said tubular cavity.

The second embodiment's fluid medium may comprise mineral oil, and may additionally comprise nanoparticles (e.g., metallic nanoparticles) to enhance heat transfer. Nanoparticles may comprise, for example, copper, beryllium, titanium, nickel, iron, alloys or blends thereof, and carbon. The term nanoparticle may conveniently be defined as including particles having an average size of up to about 2000 nm. See, e.g., the '320 patent. The elastomeric multifunction ring may comprise polyaryletherketone (PAEK), for example, polyetheretherketone (PEEK). See, e.g., the '057 patent.

In a third invention embodiment of the invention a circular elastomeric multifunction ring symmetrical about a longitudinal axis has a first end, a second end, a cylindrical inner surface, a cylindrical outer surface, and a totally-enclosed circumferential tubular cavity, the tubular cavity being filled with a fluid medium for transferring heat and for transmitting hydraulic pressure throughout said tubular cavity. The first end is plane and the second end comprises a concave chevron-shaped circumferential feature.

The third embodiment's fluid medium may comprise mineral oil, and may additionally comprise nanoparticles (e.g., metallic nanoparticles) to enhance heat transfer. Nanoparticles may comprise, for example, copper, beryllium, titanium, nickel, iron, alloys or blends thereof, and carbon. The term nanoparticle may conveniently be defined as including particles having an average size of up to about 2000 nm. See, e.g., the '320 patent. The elastomeric multifunction ring may comprise polyaryletherketone (PAEK), for example, polyetheretherketone (PEEK). See, e.g., the '057 patent Note that the invention includes a plunger packing assembly comprising at least one circular elastomeric multifunction ring of the first, second and/or third embodiment, as well as a plunger pump which comprises at least one such plunger packing assembly.

Pressurization of a plunger packing assembly is generally a combination of static and dynamic forces. Static pressurization can result from tightening a packing gland nut, while dynamic pressurization can result from pressurized pumped fluid (e.g., during periodic pump pressure strokes). Either static or dynamic pressurization of plunger packing tends to cause longitudinal compression of the elastomeric multifunction ring(s) present in the plunger packing assembly. The result is uniformly symmetrical radial expansion of the elastomeric multifunction ring against both a plunger and its packing box. Longitudinal compressive force thus applied to an elastomeric multifunction ring is mediated via the chevron-shaped packing ring(s) lying between the elastomeric multifunction ring and the pumped fluid. Thus the dynamic response of a plunger packing assembly as a whole may be altered by changing the compliance of the chevron-shaped packing rings and/or their coefficient of friction with the plunger and packing box.

DETAILED DESCRIPTION

Figure 1:
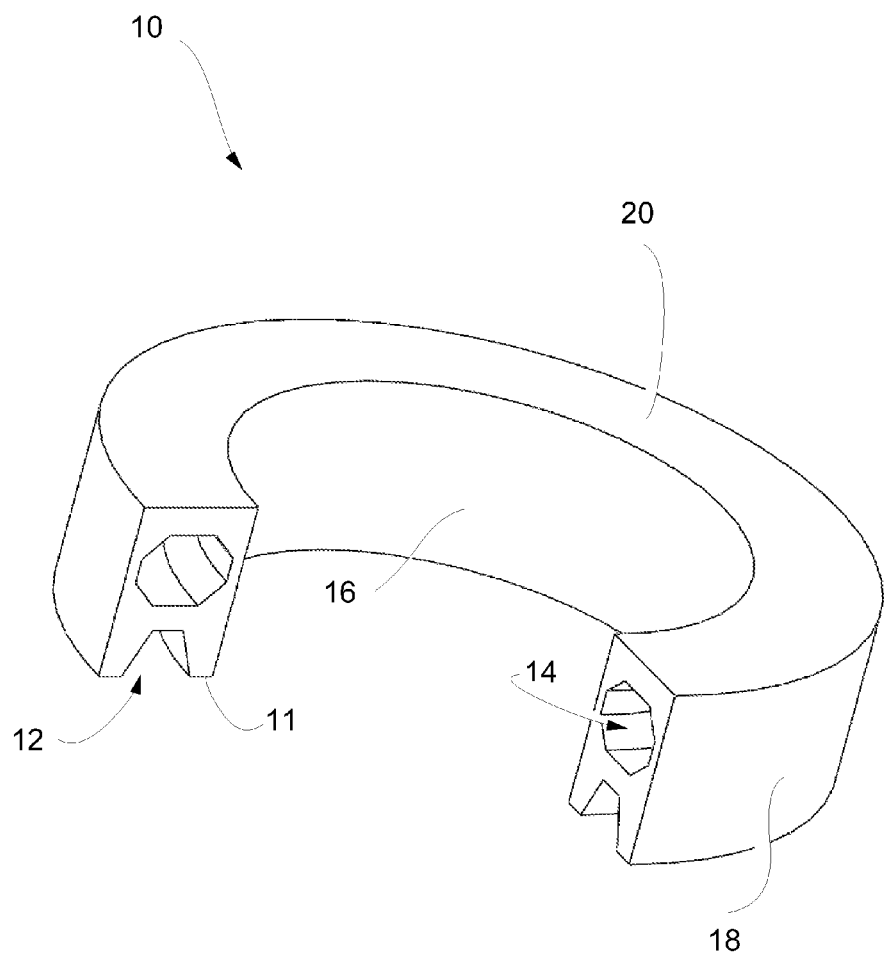
FIG. 1 is a 3-dimensional partial cross-sectional view of a plunger seal ring schematically illustrating a plane end, a circumferential tubular cavity, and an end having a chevron-shaped (concave) circumferential feature.
Figure 2:
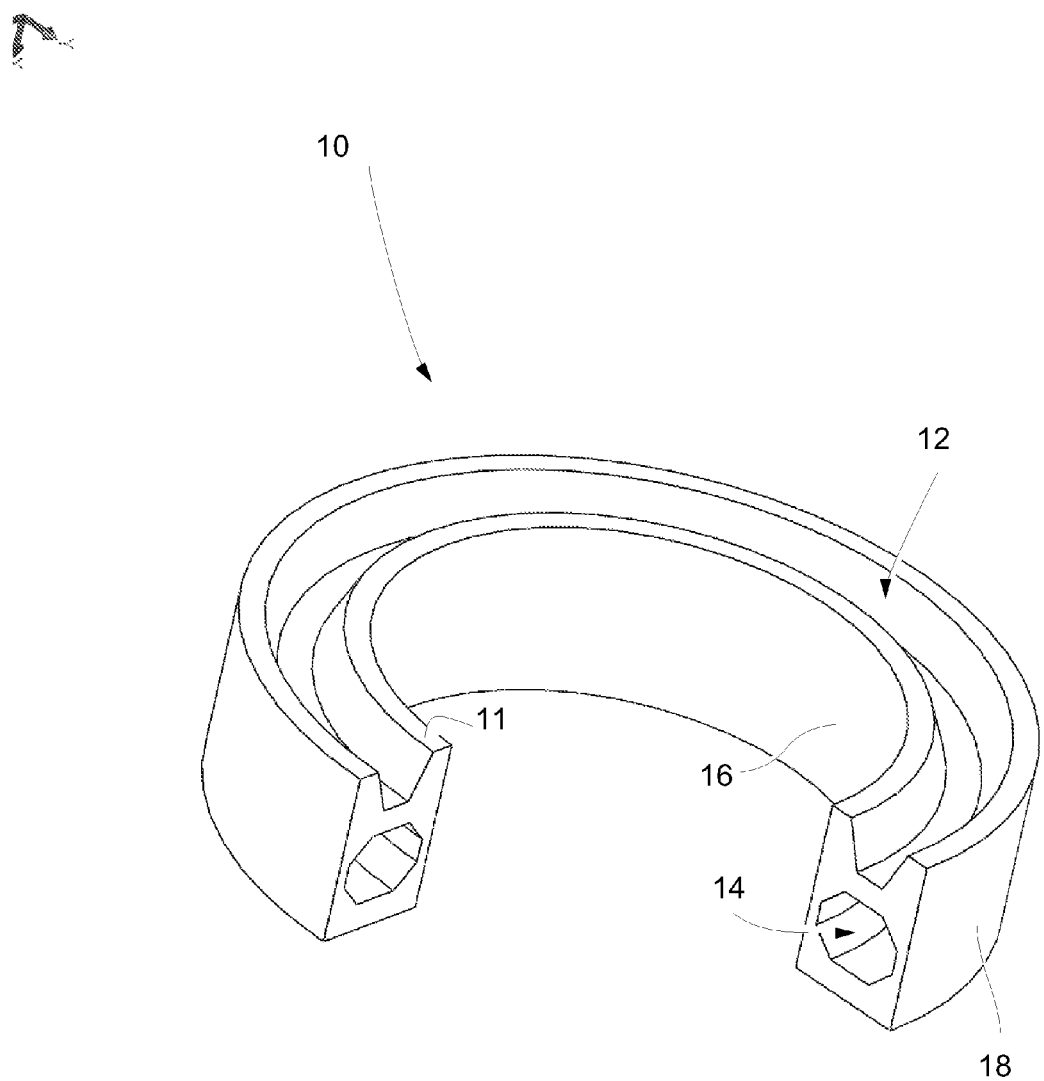
FIG. 2 is an inverted 3-dimensional partial cross-sectional view of the plunger seal ring schematically illustrated in FIG. 1, the view showing the chevron-shaped (concave) circumferential feature more completely.
Figure 3:
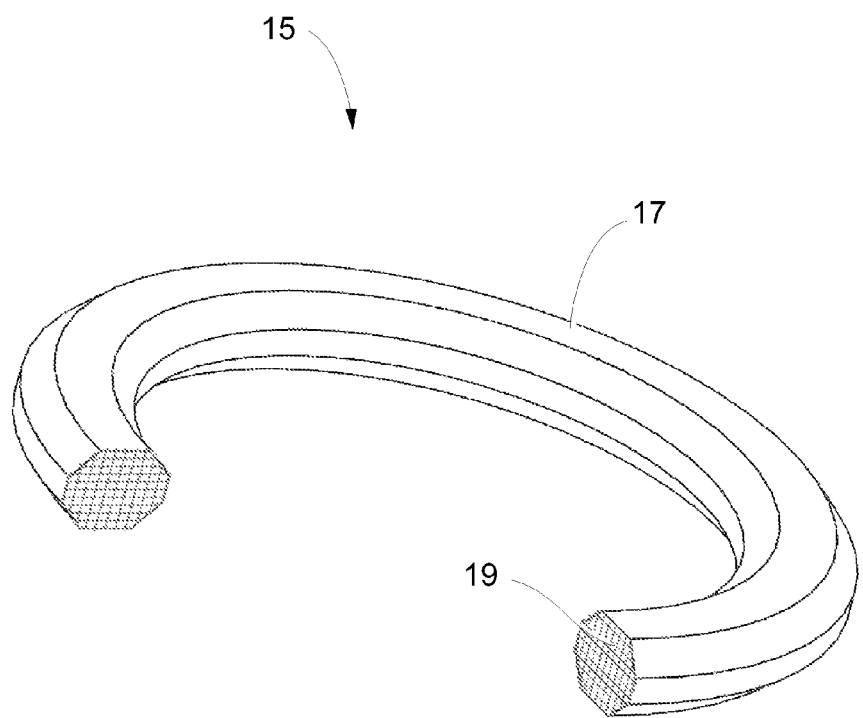
FIG. 3 is an instantaneous 3-dimensional partial cross-sectional view of a fluid medium additionally comprising nanoparticles, the view schematically illustrating that the shape of the fluid medium within the circumferential tubular cavity of FIG. 1 or FIG. 2 closely reflects the shape of the circumferential tubular cavity of FIG. 1 or FIG. 2.

FIGS. 1 and 2 show different schematic views of a circular elastomeric multifunction ring 10 of the invention, which is further described below. FIG. 3 refers to a schematic representation of the instantaneous shape of fluid medium 17 as it lies within circumferential tubular cavity 14 of ring 10. Note that the instantaneous spatial configuration 15 of fluid medium 17 as shown in FIG. 3 conforms closely to the interior of tubular cavity 14 as shown schematically in FIGS. 1 and 2. Such close conformation ensures that fluid medium 17 will uniformly transmit hydraulic pressure arising in any portion of tubular cavity 14 (as, for example, resulting from longitudinal compression of ring 10).

In a first invention embodiment, a circular elastomeric multifunction ring 10 symmetrical about a longitudinal axis has a first end 11, a second end 20, a cylindrical inner surface 16, a cylindrical outer surface 18, and a totally-enclosed circumferential tubular cavity 14. Tubular cavity 14 contains a fluid medium 17 for transferring heat and for transmitting hydraulic pressure throughout tubular cavity 14. Ring 10 in this embodiment comprises at least one thermoplastic polymer, and tubular cavity 14 is spaced equidistant from inner surface 16 and outer surface 18, and at least first end 11 comprises a chevron-shaped (concave) circumferential feature 12.

The first embodiment's fluid medium 17 may comprise mineral oil to which may be added metallic nanoparticles 19 which are generally invisible to the eye as they are dispersed in a colloidal suspension which is schematically illustrated by the indicated cross-sectional pattern associated with the nanoparticle label 19 in FIG. 3. Nanoparticles 19 comprise, for example, copper, beryllium, titanium, nickel, iron, alloys or blends thereof, and carbon. The term nanoparticle may conveniently be defined as including particles having an average size of up to about 2000 nm. The thermoplastic polymer of ring 10 may comprise polyaryletherketone (PAEK), for example, polyetheretherketone (PEEK).

In a second embodiment of the invention a circular elastomeric multifunction ring 10 is symmetrical about a longitudinal axis and has a first end 11, a second end 20, a cylindrical inner surface 16, a cylindrical outer surface 18, and a totally-enclosed circumferential tubular cavity 14, tubular cavity 14 containing a fluid medium 17 for transferring heat and for transmitting hydraulic pressure throughout tubular cavity 14.

The second embodiment's fluid medium 17 may comprise mineral oil to which may be added metallic nanoparticles 19 (schematically illustrated in FIG. 3 as described above) comprising, for example, copper, beryllium, titanium, nickel, iron, alloys or blends thereof, and carbon. The term nanoparticle may conveniently be defined as including particles having an average size of up to about 2000 nm.

In a third embodiment of the invention a circular elastomeric multifunction ring 10 symmetrical about a longitudinal axis has a first end 11, a second end 20, a cylindrical inner surface 16, a cylindrical outer surface 18, and a totally-enclosed circumferential tubular cavity 14, tubular cavity 14 containing a fluid medium 17 for transferring heat and for transmitting hydraulic pressure throughout said tubular cavity. The first end is plane and the second end comprises a chevron-shaped (concave) circumferential feature 12.

In addition to the first, second and third example embodiments, still other alternative invention embodiments exist. For example, a plunger packing assembly may comprise a plurality of elastomeric multifunction rings of the invention interspersed with (for example, arranged alternately with) rubberized fabric or analogous chevron-shaped plunger packing rings. Note that chevron-shaped plunger packing rings as described herein are packing rings having at least one end (and frequently both ends) comprising a substantially convex circumferential feature or a substantially concave circumferential feature.

Such interspersed plunger packing assembly embodiments thus have a plurality of extrusion gaps (i.e., one extrusion gap associated with each elastomeric multifunction ring of the invention) when installed over a plunger in a pump. During a pump pressure stroke, the pumped fluid pressure will then be distributed over the longitudinal dimension of the plunger packing assembly, with partial pressure differentials associated with each extrusion gap and the adjacent rubberized fabric or analogous chevron-shaped packing ring(s). While the total of the instantaneous partial pressure differentials at a given time approximates the total instantaneous pressure of the pumped fluid at that given time, the instantaneous partial pressure differential associated with each extrusion gap will only be a fraction of the total pumped fluid pressure. Thus, the amounts of seal extrusion as well as frictional heating and wear associated with each such extrusion gap within the plunger packing assembly are reduced. Since both heat generation and heat scavenging are distributed over a longitudinal dimension of such a plunger packing assembly as a whole, maximum temperatures experienced by the plunger packing assembly (and corresponding temperature-related damage) are reduced.

Note that an elastomeric plunger packing ring of the invention may be molded in corresponding mating portions which are then laser welded together using techniques well known to those skilled in the art. The mating portions are chosen to reflect the disclosure herein. See, e.g., the '057 patent and U.S. Pat. No. 3,617,589 (incorporated herein by reference). Following the welding step, one or more holes may be drilled to access the interior tubular cavity, with subsequent filling of the tubular cavity with fluid medium and, if desired, nanoparticles. Subsequent welding closure of the drilled access holes will yield a circular elastomeric multifunction ring substantially as described herein.

Note also that the fluid medium within a circular elastomeric multifunction ring of the invention may be maintained (e.g., by temperature control) in a sufficiently solid state during ring fabrication to permit use of rapid-prototyping (i.e., layer-wise) techniques. Such techniques may obviate the fluid-filling step above. See, e.g., the '057 patent and U.S. Pat. No. 3,617,589, incorporated herein by reference.

What is claimed is:

1. A circular elastomeric multifunction ring symmetrical about a longitudinal axis and having a first end, a second end, a cylindrical inner surface, a cylindrical outer surface, and a totally-enclosed circumferential tubular cavity, said tubular cavity filled with a liquid fluid medium for transferring heat and for transmitting hydraulic pressure throughout said tubular cavity;
   wherein said elastomeric multifunction ring comprises at least one thermoplastic polymer;
   wherein said tubular cavity is spaced equidistant from said inner surface and said outer surface; and
   wherein at least said first end comprises a chevron-shaped circumferential feature.

2. The circular elastomeric multifunction ring of claim 1 wherein said fluid medium comprises mineral oil.

3. The circular elastomeric multifunction ring of claim 2 wherein said fluid medium additionally comprises nanoparticles.

4. The circular elastomeric multifunction ring of claim 3 wherein said nanoparticles comprise metallic nanoparticles having an average size of up to about 2000 nm.

5. The circular elastomeric multifunction ring of claim 1 wherein said thermoplastic polymer comprises polyaryletherketone.

6. A plunger packing assembly comprising at least one circular elastomeric multifunction ring of claim 1.

7. A pump comprising at least one plunger packing assembly of claim 6.

8. A circular elastomeric multifunction ring symmetrical about a longitudinal axis and having a first end, a second end, a cylindrical inner surface, a cylindrical outer surface, and a totally-enclosed circumferential tubular cavity, said tubular cavity filled with a liquid fluid medium for transferring heat and for transmitting hydraulic pressure throughout said tubular cavity;
   wherein said tubular cavity is spaced equidistant from said inner surface and said outer surface; and
   wherein at least said first end comprises a chevron-shaped circumferential feature.

9. The elastomeric multifunction ring of claim 8 wherein said fluid medium comprises mineral oil.

10. The elastomeric multifunction ring of claim 9 wherein said fluid medium additionally comprises nanoparticles.

11. The elastomeric multifunction ring of claim 10 wherein said nanoparticles comprise metallic nanoparticles having an average size of up to about 2000 nm.

12. The elastomeric multifunction ring of claim 8 comprising polyaryletherketone.

13. A plunger packing assembly comprising at least one circular elastomeric multifunction ring of claim 8.

14. A pump comprising at least one plunger packing assembly of claim 13.

15. A circular elastomeric multifunction ring symmetrical about a longitudinal axis and having a first end, a second end, a cylindrical inner surface, a cylindrical outer surface, and a totally-enclosed circumferential tubular cavity, said tubular cavity filled with a liquid fluid medium for transferring heat and for transmitting hydraulic pressure throughout said tubular cavity;
   wherein said first end is plane;
   wherein said second end comprises a concave chevron-shaped circumferential feature; and
   wherein said tubular cavity is spaced equidistant from said inner surface and said outer surface.

16. The elastomeric multifunction ring of claim 15 wherein said fluid medium comprises mineral oil.

17. The elastomeric multifunction ring of claim 16 wherein said fluid medium additionally comprises nanoparticles.

18. The elastomeric multifunction ring of claim 17 wherein said nanoparticles comprise metallic nanoparticles have an average size of up to about 2000 nm.

19. A plunger packing assembly comprising at least one circular elastomeric multifunction ring of claim 15.

20. A pump comprising at least one plunger packing assembly of claim 19.

* * * * *